INVENTORS
D.M. VESPER
G.A. JACKSON
BY Young & Quigg
ATTORNEYS

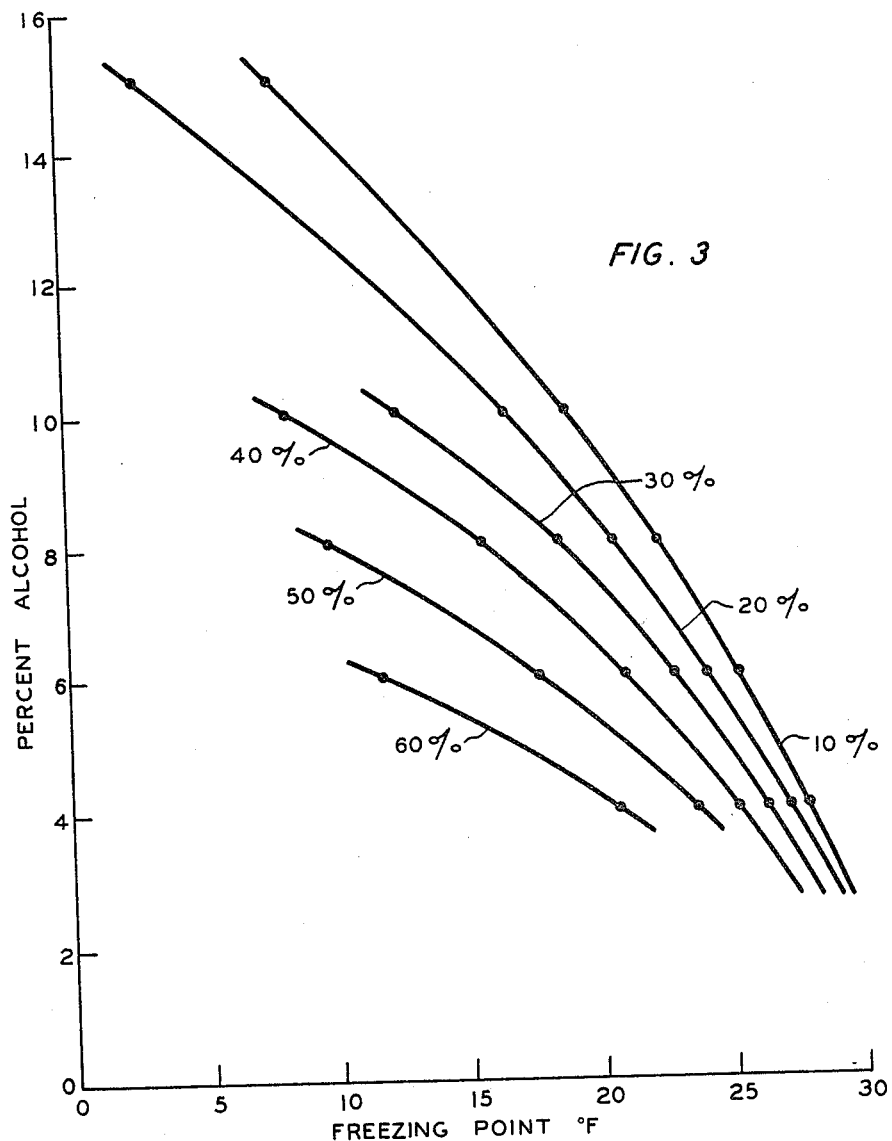

United States Patent Office 3,285,023
Patented Nov. 15, 1966

3,285,023
CONTROLLING CRYSTALLIZER COOLING RESPONSIVE TO TEMPERATURE AND FREEZING POINT OF THE MATERIAL
Daniel M. Vesper, Bartlesville, Okla., and Glenn A. Jackson, Ann Arbor, Mich., assignors to Phillips Petroleum Company, a corporation of Delaware
Filed Oct. 24, 1963, Ser. No. 318,593
6 Claims. (Cl. 62—58)

This invention relates to the separation of materials by means of fractional crystallization. In another aspect it relates to the control of the solids content of slurries produced in a chiller.

Fractional crystallization has been employed in recent years as a method of separating materials which are difficult to separate by other known procedures, such as fractional distillation or solvent extraction. Fractional crystallization is particularly useful in concentrating food products and beverages which are in the form of aqueous solutions. In this field, concentration by crystallization represents a considerable improvement over evaporative processes which rely upon heat and/or extremely low pressures. This improvement is due to the fact that removal of water by evaporation often results in the loss of essential oils and esters so that the concentrated product can never be restored to its original freshness and flavor.

In one particular method of separating materials by fractional crystallization, the feed mixture is cooled in a chiller to form a slurry of crystals and mother liquor. This slurry is directed into a purification zone in which the crystals are passed as a compact mass through a body of crystal melt which is displaced back through the crystal mass. The purification zone includes a liquid removal zone, a reflux zone and a melting zone, the latter being either within the column or external thereto. Mother liquor is removed from the crystals in the liquid removal zone, and the crystals are melted in the melting zone. A portion of the crystal melt is withdrawn from the melting zone, and the remainder is forced back into the crystal mass as reflux.

In separation procedures of this type, it has been found to be highly desirable to produce a crystal slurry which has a substantially constant solids content. This permits a high purity product to be obtained with good yields, while maintaining a uniform operation. In addition, it is often desirable to maintain the solids content of the slurry as high as possible, while still producing a mixture which is capable of being pumped through the separation equipment. In order to maintain such a high solids content slurry, accurate control over the refrigerant process is required.

In accordance with one embodiment of this invention, the feed mixture supplied to the chiller is analyzed to determine changes in composition of the feed mixture which change the freezing point of the feed. For example, measurement of the alcohol content in alcoholic beverages provides a signal representative of the freezing point of the beverage. The temperature of the slurry discharged from the chiller is measured and the flow of coolant to the chiller is regulated so that the temperature of the slurry is maintained at a preselected value. A signal representative of the analysis of the feed mixture is employed to set the temperature at which the slurry is maintained. In this manner, a slurry having a constant solids content is produced.

If the composition of the feed material remains substantially constant, it is not necessary to use a feed analysis signal for control. Under these circumstances, control of coolant to maintain a constant temperature of the slurry is adequate. However, even minor fluctuations in temperature of the slurry often have a significant effect on the solids content. For this reason, it is necessary to employ an extremely sensitive temperature sensing means so that the slurry temperature can be maintained within a narrow temperature range. A temperature sensing device employing a thermistor in contact with the slurry can be employed for this purpose.

Accordingly, it is an object of this invention to provide improved procedures for concentrating materials by crystallization.

Another object is to provide systems for controlling the solids content of slurries produced by cooling feed mixtures.

A further object is to provide control systems for use in fractional crystallization systems.

Other objects, advantages and features of the invention should become apparent from the following detailed description, taken in conjunction with the accompanying drawing in which:

FIGURE 3 is a graphical representation of operating features of the control procedure of this invention.

Figure 1:
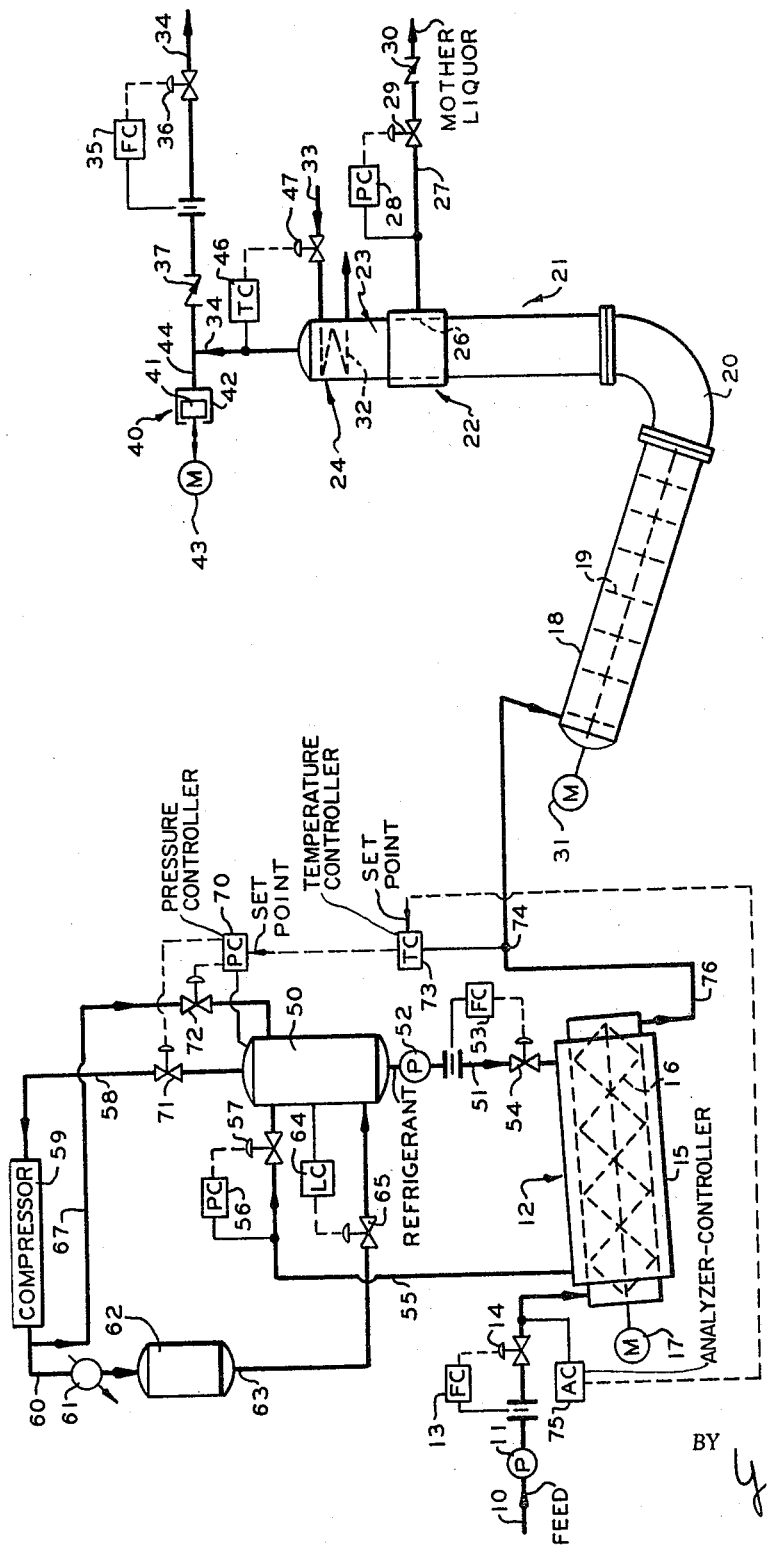
FIGURE 1 is a schematic representation of a fractional crystallization system having the control apparatus of this invention incorporated therein.

Referring now to the drawing in detail and to FIGURE 1 in particular, a feed mixture to be concentrated is directed by means of a conduit 10, which has a pump 11 therein, to the inlet of a scraped surface chiller 12. The flow through conduit 10 is maintained at a constant rate by means of a flow controller 13 which regulates a valve 14. Chiller 12 is provided with a jacket 15 through which a suitable refrigerant, such as ammonia, is circulated. A scraper 16 within the chiller is rotated by means of a motor 17. The feed mixture is partially frozen in chiller 12, and the resulting slurry is conveyed by a conduit 76 to the inlet of a crystal growth tank 18. The residence time of the slurry in tank 18 is such as to permit the crystals to grow to a desired size. Tank 18 is provided with an agitator 19 which is rotated by a motor 31. The residence time of the slurry in tank 18 can advantageously be of the order of 1 to 10 hours. While longer times are desirable from the viewpoint of crystal growth, such longer times generally are not justified from an economic viewpoint. While growth tank 18 is desirable, it is generally not essential to satisfactory operation of the process.

The outlet of tank 18 is connected by means of an elbow 20 to the inlet of a purification column 21. Column 21 comprises a filtration section 22, a reflux section 23, and a melting section 24. A suitable filter screen 26 is provided in the filter section to permit withdrawal of mother liquor through an outlet conduit 27. The flow through conduit 27 is regulated by a pressure controller 28 which adjusts a valve 29 to maintain a preselected pressure in conduit 27. Conduit 27 is also provided with a check valve 30.

The remaining crystal mass is passed from the filtration section 22 into the reflux section 23 wherein it is countercurrently contacted with crystal melt that is produced by a heating element 32 which is disposed in the melting section of the column. A heating material is circulated through coil 32 by means of a conduit 33. The heat supplied by coil 32 melts the crystals as they approach the end of the column. A portion of the resulting melt is withdrawn through an outlet conduit 34, and the remainder of the melt flows back through the crystal mass to provide reflux. The rate at which heat is supplied to the melting zone is controlled by a temperature controller 46 which regulates a valve 47 in conduit 33 to maintain a constant melt temperature. The flow through outlet conduit 34 is maintained at a predetermined rate by means of a flow controller 35 which adjusts a valve 36. A check valve 37 is also provided in conduit 34.

The purification column is provided with a pressure pulsating means 40 which comprises a piston 41 that is reciprocated within a cylinder 42 by a suitable motor 43. Cylinder 42 is connected to conduit 34 by means of a conduit 44. The reciprocating movement of piston 41 applies a pulsating pressure to the interior of the column which tends to move the crystal mass back and forth to provide more intimate contacting. As described in detail in U.S. Patent No. 2,854,494, this fluctuating pressure improves the operation of the column.

In accordance with this invention, the solids content of the slurry passed to tank 18 is maintained at a preselected value. This is accomplished by controlling the amount of coolant supplied to jacket 15 of chiller 12. Liquid refrigerant, such as ammonia, is removed from a tank 50 and directed to the inlet of jacket 15 through a conduit 51 which has a pump 52 therein. The flow of liquid refrigerant is maintained at a constant value by a flow controller 53 which adjusts a valve 54. The spent refrigerant is removed from jacket 15 through a conduit 55 which communicates with tank 50. A pressure controller 56 adjusts a valve 57 in conduit 55 to maintain a predetermined pressure on the refrigerant within shell 15. Refrigerant vapors are removed from the top of tank 50 through a conduit 58 which communicates with the inlet of a compressor 59. A portion of the resulting compressed vapors is directed through a conduit 60, which has a condenser 61 therein, to a surge tank 62. The resulting condensed refrigerant is returned to tank 50 through a conduit 63. A level controller 64 on tank 50 adjusts a valve 65 in conduit 63 so that liquid is returned to tank 50 at a rate which maintains a constant liquid level within the tank. The remainder of the compressed refrigerant vapors is returned from compressor 59 directly to tank 50 through a conduit 67. The amount of cooling supplied to chiller 12 by the refrigerant is controlled by adjusting the pressure on the boiling refrigerant in tank 50. This is accomplished by a pressure controller 70 which adjusts valves 71 and 72 in respective conduits 58 and 67. Pressure controller 70 adjusts these valves in response to a measurement of the pressure within tank 50. The two control valves are manipulated in opposite directions by pressure controller 70 so as to maintain the desired pressure in tank 50. For example, if it is desired to increase the pressure in tank 50, valve 71 is moved toward a more closed position and valve 72 is moved toward a more open position. The reverse is provided to reduce the pressure in tank 50.

The set point of pressure controller 70 is manipulated in accordance with this invention to maintain a desired solids concentration in the slurry directed through conduit 76. The set point of controller 70 is adjusted by the output signal of a temperature controller 73. Temperature controller 73 provides this output signal in response to a measurement of the temperature of the slurry in conduit 76. To this end, a temperature transducing element 74 is positioned in thermal contact with the slurry transmitted through conduit 76. The set point of temperature controller 73 is adjusted in response to the output signal from an analyzer-controller 75 which measures and transmits a signal representative of the composition of the feed mixture supplied through conduit 10.

Figure 2:
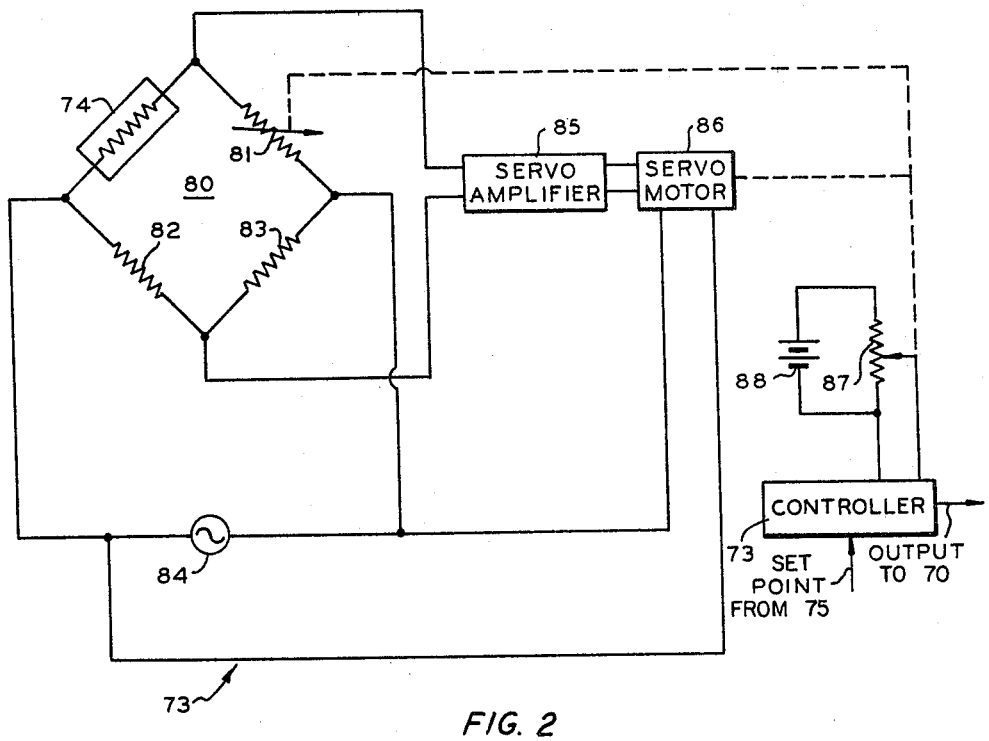
FIGURE 2 is a schematic circuit drawing of temperature measuring and control apparatus which can be employed in the system of FIGURE 1.

The solids content of the slurry in conduit 76 is quite sensitive to fluctuations in temperature of this slurry. Accordingly, it is necessary to employ a temperature transducing element 74 which responds to extremely small changes in temperature. As illustrated in FIGURE 2, a temperature sensitive resistance element 74 can be employed for this purpose. Element 74 forms one arm of a bridge network 80. A variable resistor 81 forms an adjacent arm of the network. Resistors 82 and 83 form the remaining arms. An alternating voltage source 84 is connected across first opposite terminals of bridge network 80. The second opposite terminals are connected to the input of a servo amplifier 85. The output signal from amplifier 85 actuates a reversible servo motor 86. This motor can be a two phase induction motor which has one coil energized from voltage source 84. The drive shaft of motor 86 is connected to resistor 81 and to the arm of a potentiometer 87. Amplifier 85 and motor 86 operate in such a fashion as to change the value of resistor 81 by an amount sufficient to restore the bridge to a condition of balance whenever a change in temperature is detected by element 74. Suitable circuits which operate in this manner are well known to those skilled in the electrical control art.

A voltage source 88 is connected across the end terminals of potentiometer 87. The contactor and first end terminal of potentiometer 87 are connected to the input of controller 73. The voltage thus applied to the input of controller 73 is a function of the position of the drive shaft of servo motor 86. This, in turn, is representative of the temperature sensed by element 74. An input signal is thus applied to controller 73 which is representative of the measured temperature of the slurry in conduit 76. This signal is compared with a set point value by controller 73, and an output signal representative of the difference between these values is applied to the set point of pressure controller 70 of FIGURE 1. Controller 73 can be any instrument known in the art, many forms of which are commercially available. If it is desired to employ a pneumatic controller, for example, the controller can be provided with an input transducer to convert the electrical signal from potentiometer 87 into a corresponding air pressure.

In many operations, the feed stream supplied to chiller 12 often changes in composition. Such changes can have significant effects on the freezing point of the feed mixture, and thus the solids content of the effluent slurry from the chiller. In order to detect changes in composition of the feed mixture, analyzer 75 is provided. This instrument establishes an output signal which is representative of the freezing point of the feed mixture. For example, a measurement of the alcohol in beer provides a signal representative of the freezing point of the beer. In general, an analysis of any feed mixture provides information regarding the freezing point of the mixture. A chromatographic analyzer is a typical instrument which can be employed to advantage for this purpose. However, other types of process analyzers can often be employed, depending upon the nature of the feed mixture.

The control procedure of this invention is particularly useful in regulating the concentration of beer. FIGURE 3 is a graphical representation of operating features of such a process. The several curves, each of which represents a slurry of selected solids, content, show the freezing points of a typical beer as a function of the alcohol content. The illustrated curves are for slurries having solids contents of from 10 to 60 percent by weight. The desired solids content of the slurry will depend upon the degree of concentration desired, and will often vary for different types of feed mixtures. It is desirable to maintain the solids content of the slurry at a preselected constant value, which value usually is a high as can be employed while maintaining a movable slurry. If the solids sents a slurry of selected solids content, show the freezing the feed to a solid mass. For beer concentration, solids contents as high as 50 to 60 weight percent can often be employed. In concentrating beer, analyzer 75, which can be a chromatographic analyzer, provides an output signal which is representative of the alcohol content of the feed. If this content remains stationary, the desired freezing point temperature to maintain the constant solids content, as shown by FIGURE 3, also remains constant. In this case, the set point of controller 73 does not change and the refrigerant supplied to the chiller is controlled in order to maintain a constant measured temperature in conduit 76. However, if the alcohol content of the feed mixture should change, controller 75 provides a signal which changes the set point of temperature controller 73. An increase in alcohol content, for example, requires a lower operating temperature in order to maintain the solids content of the slurry at the desired value. Analyzer 75 detects such a change in alcohol and resets controller 73 to maintain the necessary lower temperature. It can be seen from an inspection of FIGURE 3 that the curves are substantially linear. This is particularly true of any practical operating range because the alcoholic content changes very slightly. However, controller 75 can be provided with a non-linear element in the output to compensate for any non-linearity in the curves if this is necessary. A suitable cam or non-linear potentiometer, for example, can be provided for this purpose.

While this invention has been described in conjunction with presently preferred embodiments, it obviously is not limited thereto.

What is claimed is:

1. In a process wherein a feed mixture is cooled to crystallize a portion thereof to form a slurry; the method of regulating the process to produce a slurry having a substantially constant solids content which comprises measuring the temperature of the slurry and establishing a first signal representative of such temperature, measuring a property of the feed mixture which is representative of the freezing point thereof and establishing a second signal representative of such measured property, comparing said first and second signals, and regulating the amount of cooling to which the feed mixture is subjected to maintain a predetermined relationship between said first and second signals.

2. The method of claim 1 wherein the feed mixture is beer and wherein the property measured is the alcoholic content of the beer.

3. In a process wherein a feed mixture to be cooled to crystallize a portion thereof to form a slurry is passed through a heat exchange zone, and a volatile liquid refrigerant is passed from a storage zone to said heat exchange zone to cool the feed mixture; the method of regulating the process to produce a slurry having a substantially constant solids content which comprises measuring the temperature of the slurry and establishing a first signal representative of such temperature, measuring a property of the feed mixture which is representative of the freezing point thereof and establishing a second signal representative of such measured property, comparing said first and second signals, and regulating the pressure on the coolant in the storage zone to maintain a predetermined relationship between said first and second signals.

4. In a process wherein a feed mixture is cooled to crystallize a portion thereof to form a slurry of crystals and mother liquor, the mother liquor is removed from the crystals, the crystals are passed through a purification zone to a melting zone, and a portion of the resulting melt is passed countercurrent to the crystals in the purification zone; the method of regulating the process to produce a slurry having a substantially constant solids content which comprises measuring the temperature of the slurry and establishing a first signal representative of such temperature, measuring a property of the feed mixture which is representative of the freezing point thereof and establishing a second signal representative of such measured property, comparing said first and second signals, and regulating the amount of cooling to which the feed mixture is subjected to maintain a predetermined relationship between said first and second signals.

5. In a system wherein a feed mixture is directed through a first conduit means to a cooling means wherein the feed mixture is cooled to crystallize a portion of the feed mixture, and a slurry is withdrawn from the cooling means through a second conduit means; a control system to maintain a predetermined solids content in the slurry in said second conduit means comprising means to establish a first signal representative of the temperature of the slurry in said second conduit means, means to establish a second signal representative of the freezing point of the feed mixture in said first conduit means, means to compare said first and second signals and establish a control signal representative of the difference therebetween; and means responsive to said control signal to regulate said cooling means.

6. In a system wherein a feed mixture is directed through a first conduit means to a cooling means wherein the feed mixture is cooled to crystallize a portion of the feed mixture, and a slurry is withdrawn from the cooling means through a second conduit means; a control system to maintain a predetermined solids content in the slurry in said second conduit means comprising adjustable means to regulate the amount of cooling supplied by said cooling means, means to establish a first signal representative of the temperature of the slurry in said second conduit means, an analyzer to establish a second signal representative of the freezing point of the feed mixture in said first conduit means, a controller having an input and an adjustable set point and being adapted to provide an output signal representative of the difference between signals applied to the input and the set point, means to apply said first signal to the input of said controller, means to apply said second signal to the set point of said controller, and means to apply the output of said controller to said means to regulate to adjust same.

References Cited by the Examiner

UNITED STATES PATENTS 2,940,272  6/1960  Croley _____ 62—58
3,093,649  6/1963  Ratje.

NORMAN YUDKOFF, *Primary Examiner.*